United States Patent [19]

Rozema

[11] Patent Number: 4,782,479
[45] Date of Patent: Nov. 1, 1988

[54] ELECTRONIC DIGITAL CROSSCONNECT SYSTEM

[75] Inventor: John G. Rozema, Elmhurst, Ill.

[73] Assignee: Rockwell International, El Segundo, Calif.

[21] Appl. No.: 904,727

[22] Filed: Sep. 8, 1986

[51] Int. Cl.$^4$ ............................................. H04Q 11/04
[52] U.S. Cl. ........................................ 370/68; 370/66
[58] Field of Search .................... 370/66, 67, 68, 68.1, 370/85

[56] References Cited

U.S. PATENT DOCUMENTS

| 4,032,719 | 6/1977 | Blasbalg | 370/66 |
| 4,178,478 | 12/1979 | Baichtal et al. | 370/66 |
| 4,521,880 | 6/1985 | Orsic | 370/68 |
| 4,530,092 | 7/1985 | Hafer | 370/66 |

Primary Examiner—Douglas W. Olms
Assistant Examiner—Wellington Chin
Attorney, Agent, or Firm—C. B. Patti; V. L. Sewell; H. F. Hamann

[57] ABSTRACT

An electronic digital crossconnect system electronically interconnecting individual subscriber channels between various higher rate digital facilities. The system provides for a simplified, lower-speed information bus structure, improved reliability, and the ability to connect intact a high rate digital facility without super frame alignment.

7 Claims, 4 Drawing Sheets

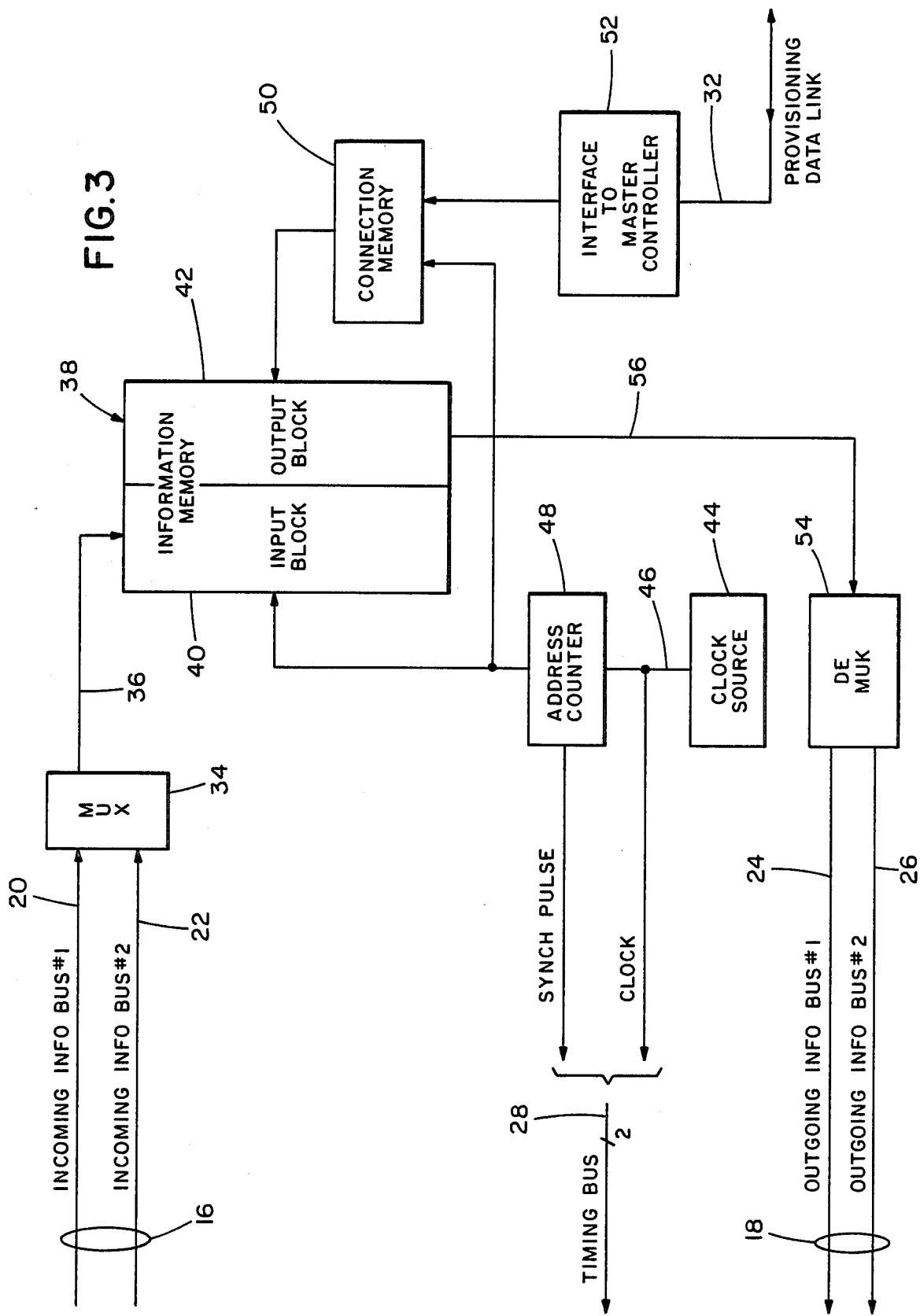

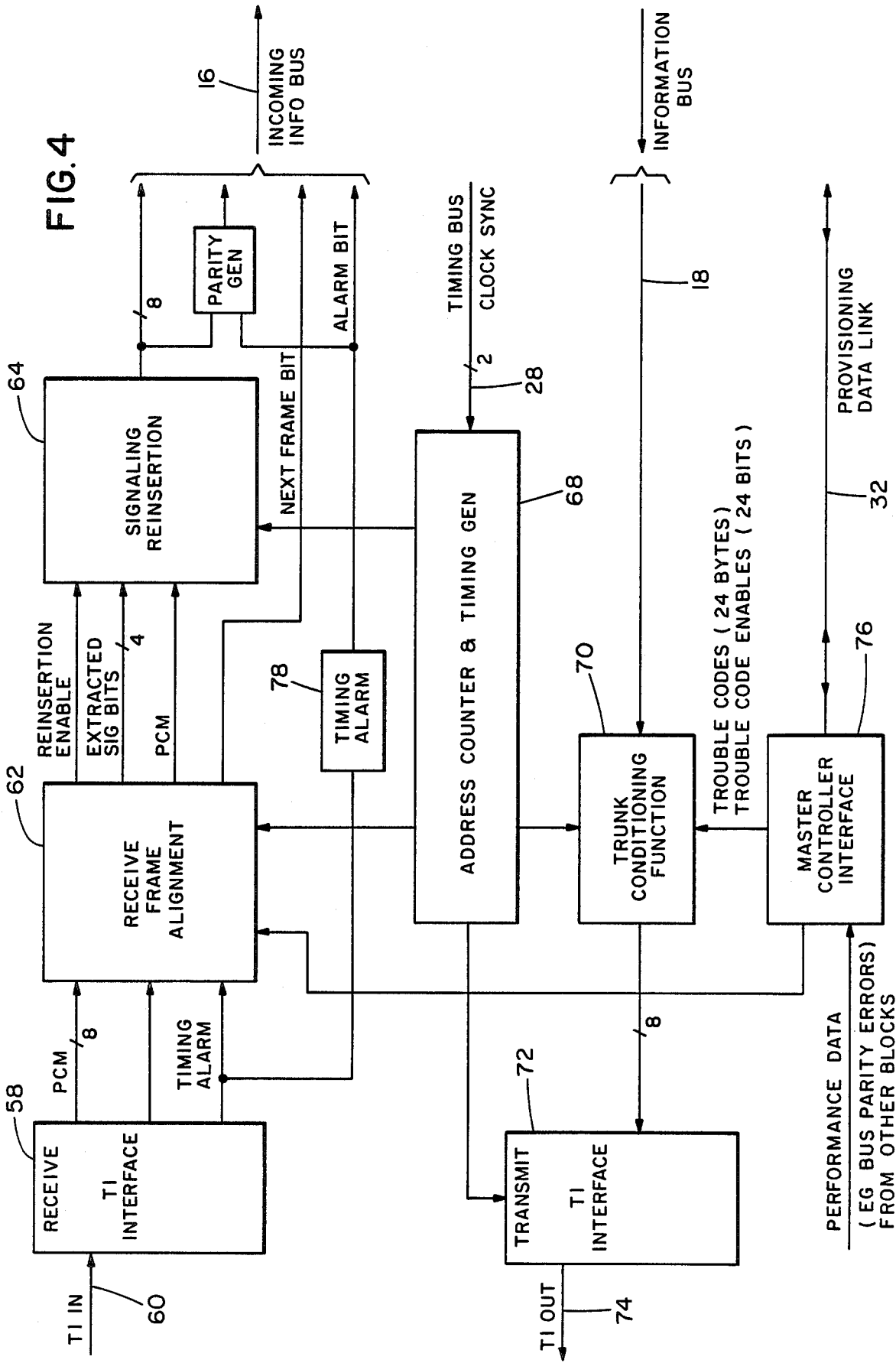

ELECTRONIC DIGITAL CROSSCONNECT SYSTEM

BACKGROUND OF THE INVENTION

The present invention pertains to an electronic digital crossconnect system and, in particular, to a crossconnect system for connecting a number of high frequency T-carrier lines.

The crossconnect system is a means for electronically interconnecting individual subscriber channels between various higher rate digital facilities. The digital crossconnect system replaces what was previously done manually by connecting various channels of several channel banks of high frequency T-carrier lines in a back-to-back configuration.

A problem in the prior art was to construct a non-blocking electronic switch for a digital crossconnect system. The size of the interconnect must be large enough to make full use of the speed of existing art semiconductor memories, yet the speed and number of signals in the associated information busses must not become a limiting factor from a feasibility or cost point of view. That is, as the size of the crossconnect system increases, higher speeds, larger fan-outs, and more signals are required in the information bus. In the prior art devices and systems, this typically requires increased cost and power consumption and the design of the bus drivers and receivers becomes more complex and thus, less feasible.

The present invention overcomes these problems in the prior art.

SUMMARY OF THE INVENTION

The novel digital crossconnect system of the present invention comprises four principal features. These features simplify the information bus considerations. The four features are: (1) no address busses; (2) split information bus to reduce bus speed and fan-out; (3) a signalling reinsertion function located so as to eliminate the need for special signalling leads in the information busses; (4) trouble code and trunk conditioning function located on the outgoing side so as to maximize reliability, and (5) the ability to connect intact all channels associated with a single T-carrier source to one other T-carrier output without requiring superframe alignment or introducing the degrading effects of pseudo-superframe alignment.

The electronic digital crossconnect system interconnects a plurality of high frequency T-carrier lines, each having an input and output line. A plurality of interfaces connect the input and output lines of each of the T-carrier lines and each of the interfaces has an output port and an input port. A time slot interchanger is provided which has at least one input port and at least one output port. Two information busses are provided, an incoming information bus and an outgoing information bus. The incoming information bus is connected between each of the output ports of the interfaces and the input port of the time slot interchanger. The outgoing information bus connects the output port of the time slot interchanger and each of the input ports of the line interfaces. Received data from the input T-carrier lines are placed by the line interface modules in predetermined time slots on the incoming information bus, and the time slot interchanger reorders the signals in time slots on the outgoing information bus. Thus, the signals can be sent out on predetermined output lines of the T-carrier lines by the interfaces.

OBJECTS OF THE INVENTION

It is an object of the present invention to provide an improved electronic digital crossconnect system for use with T-carrier lines.

It is a more detailed object of the present invention to provide a system which does not utilize address busses within the system.

It is a further object of the present invention to provide split information busses so that each bus runs at half speed and drives half of the line interface devices.

It is a further object of this invention to allow, where desired, the capability to connect intact all channels associated with a given T-carrier input to any one T-carrier output without the noise introducing effects of pseudo-superframe alignment.

BRIEF DESCRIPTION OF THE DRAWINGS

The features of the present invention which are believed to be novel are set forth with particularity in the appended claims. The invention, together with further objects and advantages thereof may be best understood by reference to the following description, taken in conjunction with the accompanying drawings in the several figures of which like reference numerals identify like elements, and in which:

FIG. 3 is a more detailed block diagram of a time slot interchanger used within the system;

FIG. 4 is a more detailed block diagram of the line interface modules used within the system.

DESCRIPTION OF THE PREFERRED EMBODIMENT

Figure 1:
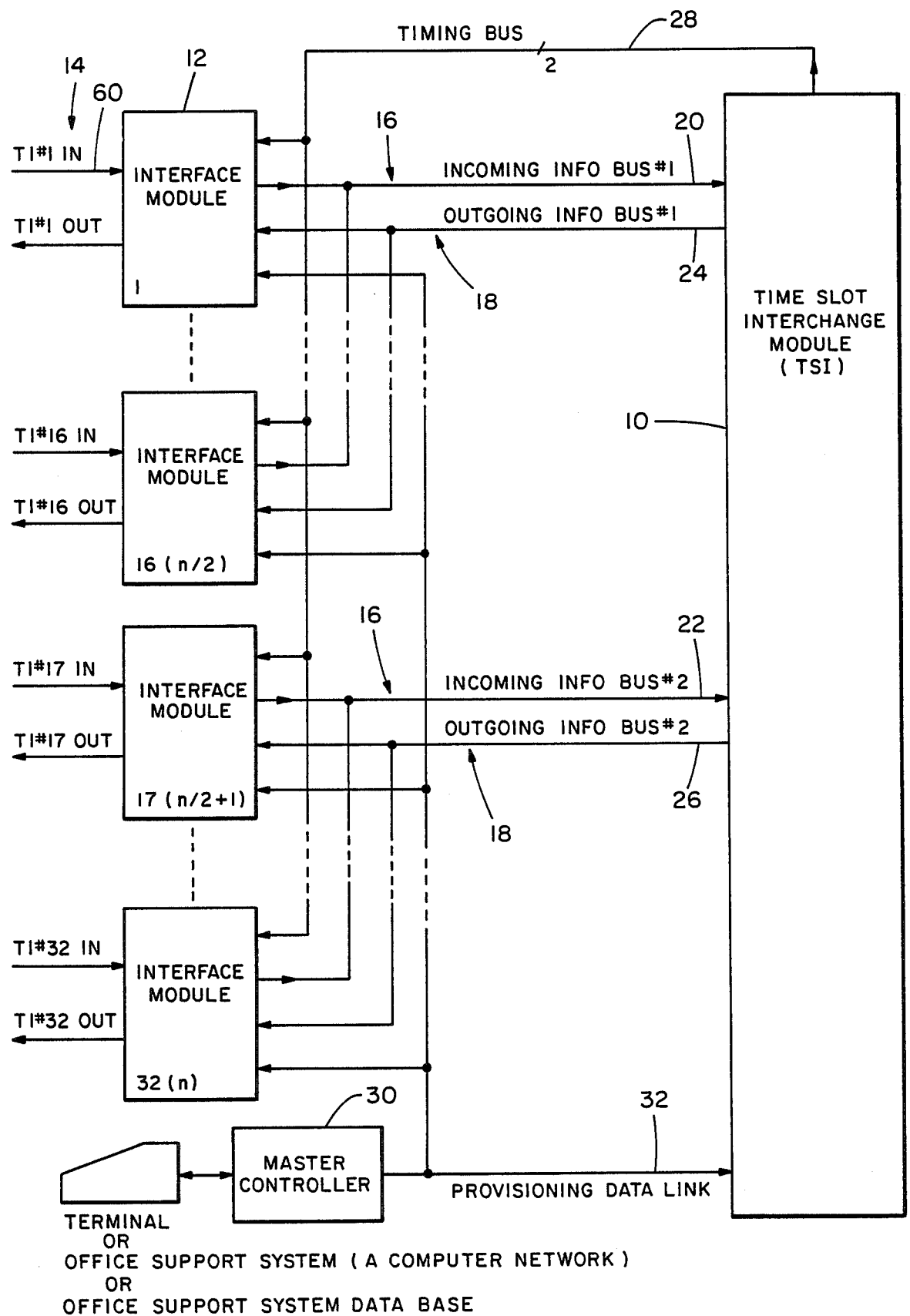
FIG. 1 is a general block diagram of the electronic digital crossconnect system.

FIG. 1 illustrates in general block diagram form a distributed non-blocking information switch for use as an electronic digital crossconnect system which can operate as a standalone system, or may be used as a subsystem of other switching or crossconnect systems. As shown in FIG. 1, the system has a time slot interchanger (TSI) module 10 connected to a plurality of line interface modules 12. The line interface modules 12 interface to high frequency T-Carrier lines 14 such as the North American T1. The TSI module 10 contains both an information memory and a connection memory which function to accomplish the time slot interchange in a single time stage.

Two busses 16 and 18 connect the line interface modules 12 and the TSI module 10. In order to more clearly illustrate the invention, the incoming bus 16 is shown as incoming information bus number 1, 20, and incoming information bus number 2, 22. Similarly, the outgoing information bus 18 is shown as outgoing information bus number 1, 24 and outgoing information bus number 2, 26. On the incoming information bus, each channel of each line interface module 12 has a particular time slot on the bus 16. Address counters are provided which determine the time slots, thereby gating the appropriate channel information out of the appropriate line interface module 12 on to the information bus 16. The channel information is thus loaded into a predetermined address of the information memory which is located in the TSI module 10. On the outgoing information bus 18, the information from the TSI module 10 is transferred to the outgoing information bus 18 to the line interface modules 12. A connection memory contained within the TSI module 10 maps the incoming address sequence into the information memory read sequence. This sequence of channel addresses differs from the incoming sequence and is determined by the connection requirements. Each outgoing channel of each line interface module 12 has a unique time slot on the outgoing information bus 18 which is determined by the same address counter as the incoming information bus 16. Thus, for each particular time slot as defined by the address counter, the contents of the connection memory determine an address in information memory whose contents are placed on the outgoing information bus 18, thereby connecting an input channel to an outgoing channel.

Figure 2:
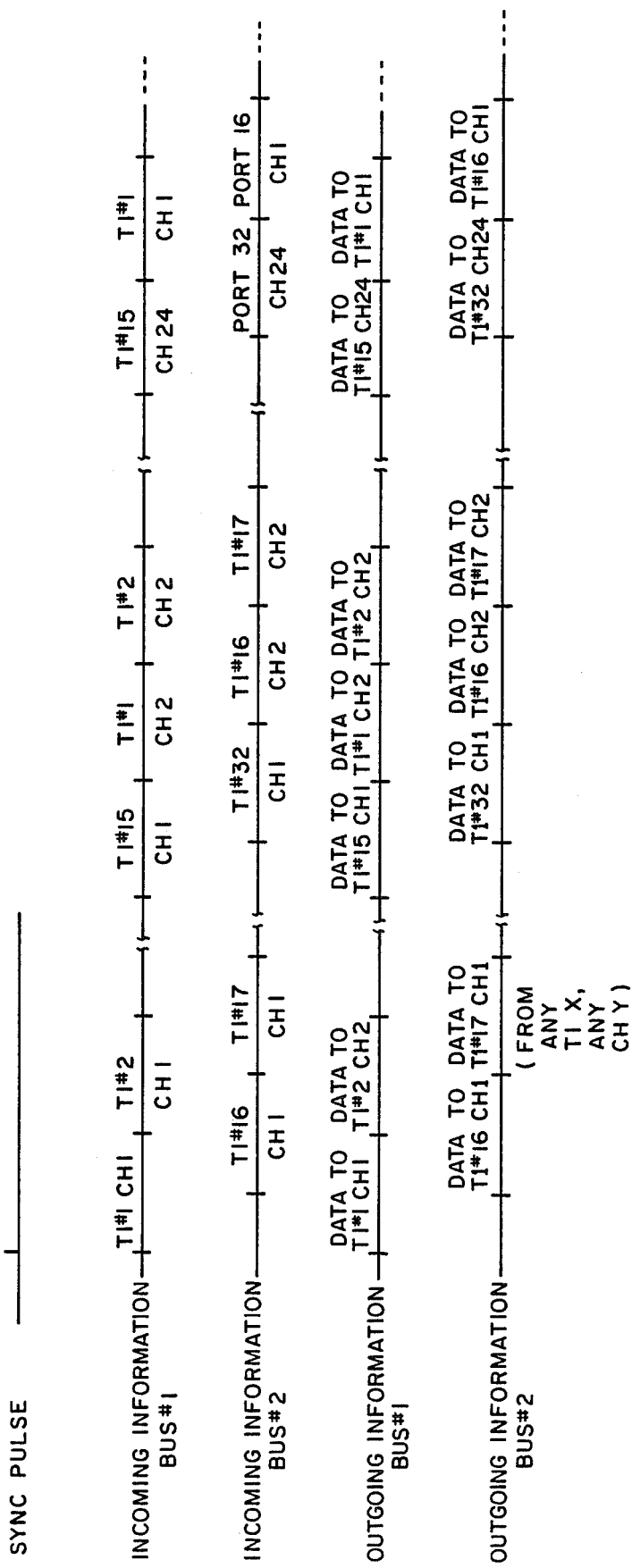
FIG. 2 illustrates the times lot assignments for the channels on the T-1 carrier lines on the internal incoming and outgoing busses.

FIG. 2 shows typical time slot assignments on the incoming and outgoing information busses 16 and 18. It is understood that other allocations of time slots on these busses could be made depending upon the type of application.

A difference between a switching system and a digital crossconnection device concerns the handling of signalling bits. One function of a switching system is the decoding of signalling bits in order to establish or terminate a call. A digital crossconnect system, however, must appear as a transparent transmission element between two channel banks or a channel bank and a switch. Signalling bits are passed through the TSI module 10 to the outgoing facility. If an incoming facility fails, the outgoing signalling bits associated with that facility must be manipulated according to a predefined sequence in order to properly terminate any calls passing through, to stop billing, and to block new calls until the facility is repaired. This is referred to as trouble code insertion and trunk conditions. Note that the outgoing signalling bits of any one facility could originate from several different incoming facilities. Only the signalling bits associated with the failed incoming facility must be processed.

As can be shown, in FIG. 1, the present invention of the electronic digital crossconnect system has several important novel features.

The crossconnect system of the present invention does not use address busses. Instead, an address counter is duplicated on each line interface module 12 and slaved to the time slot interchanger address counter by means of a clock and synchronizing signal. Timing bus 28 provides the clock signals between the line interface modules 12 and the TSI module 10. This eliminates the need for many signals dedicated to a parallel address bus or busses between the TSI module 10 and the line interface modules 12.

Both the incoming and outgoing information busses 16 and 18 are split, with half the line interface modules 12 on one set of busses, 20 and 24, and the remainder of the line interface modules 12 on the other set of busses, 22 and 26. Each bus 20, 22, 24, and 26, runs at half speed, and is recombined in the TSI module 10. Thus, the bus drivers are required to drive half the number of line interface modules 12, at half the speed. Therefore, bus driver design and cost is considerably reduced. The high-speed recombined portion of the busses is strictly internal to the TSI module 10, and connects only to the information memory contained therein.

Since a digital crossconnect system must pass signaling bits through its switching fabric, some sort of multi-frame alignment is required so that the signalling bits of all channels occur in the same frame. Otherwise, it would not be possible to pack channels from several different incoming T-carrier sources into one common outgoing T-carrier signal containing just one allowable signalling frame alignment.

However, multi-frame alignment can require excessive delay in the signal path, which is undesirable for echo considerations, particularly when several crossconnect systems are tandomed together. Thus, most present digital crossconnect systems achieve a pseudo-frame alignment by reinserting the signalling bits into the pulse code modulated data in a new frame arbitrarily assigned as a signalling frame for all channels of all line interface modules. In the present invention, signalling reinsertion is performed on the incoming side of the line interface modules 12, just prior to its output to the information bus 20 and 22, to the TSI module 10. Thus, a special lead or leads for the signalling bits are not required in the backplane or in the connection memory. Note, however, that if all channels of a single T-carrier input are to be connected to a single T-carrier output, superframe alignment or pseudo-superframe alignment is not needed. This is because the signalling bits from one source all occur in the same signalling frames. However, it is necessary to indicate which frames are the signalling frames, since in general, these may differ from the system signalling frames. This is accomplished by passing the frame bit through the switching fabric along with the PCM data. Then, the signalling reinsertion can be disabled for those channels. This is referred to as the "connect intact" mode. Since signalling reinsertion acts to increase quantization noise, performance is improved.

Trunk conditioning and trouble codes are inserted in the outgoing side of the line interface modules 12. Although an alarm lead must pass through the information bus and TSI module 10, it maximizes reliability. A failure of the incoming facility, the incoming side of the line interface modules 12, the information bus 16 and 18, or the TSI module 10, will all assure that the affected channels are properly processed to disconnect calls. A failure to the outgoing side of the line interface modules 12 will generally cause the far end of the channel bank or switch to process all channels associated with the module. By providing a trunk processing timer for each channel, the need for two alarm leads to accomplish the two-step processing sequence is eliminated, and reliability is further improved.

The TSI module 10 will now be described in more detail and in more specific block diagrams of the TSI module 10 as shown in FIG. 3. This will now also include an explanation of the master controller 30 and the provisioning data link 32 shown in FIG. 1. As can be seen in FIG. 1, the provisioning data link 32 connects the master controller 30 to each of the line interface modules 12 and to the TSI module 10.

Referring now to FIG. 3, the incoming information busses number 1 and number 2, item 20 and item 22, are combined by the multiplexer 34 into one high-speed information bus 36, which is connected to an information memory 38. The information memory 38 provides a temporary storage for contents of the incoming information bus 36. Storage is provided for each channel of each input T-1 line. The information memory 38 consists of two sections, 40 and 42, which are alternatively written to and read from. Initially, block 40 may be the input block and block 42, the output. When block 40 is completely filled (and block 42 completely read out), then block 42 becomes the input and block 40 becomes the output.

Clock source 44 is the timing source for the entire digital crossconnect system. It may free run, but more typically it may be slaved to a larger timing network. The clock signal occurs on line 46 which becomes part of the timing bus 28. The address counter 48 defines the time slots on the incoming information busses 20 and 22. Also, by a one-to-one correspondence, it determines the address in the information memory 38 where the contents of the incoming information bus for a particular channel of a particular T-1 line is stored.

A connection memory 50 contains a map for the incoming information bus no. 1 and no. 2, 16, to the outgoing information busses no. 1 and no. 2, 18. It is a memory whose address is the destination T-1 line and channel as determined by the address counter 48. The contents of the connection memory 50 are addresses in information memory 38 of the particular T-1 line and channel which are to be outputted during the time slot indicated by the address counter 48. Contents of the connection memory 50 are provided from an external source such as via the provisioning data link 32 and interface 52 to the master controller 30. As shown in FIG. 3, the address counter 48 is connected to both the information memory 38 and the connection memory 50, which is in turn connected to the information memory 38. The interface 52 to the master controller 30, provides a means to load the contents of the connection memory supplied over the provisioning data link 32.

Finally, a demultiplexer 54 is connected to the information memory 37 by another high speed information bus 56 and separates the high-speed output from the information memory 38 into the two outgoing information busses 24 and 26.

FIG. 4 shows a more detailed block diagram of the line interface modules 12. The line interface modules 12 provide, in general, bipolar to unipolar conversion, receive clock recovery frame synchronization and timing signals, and serial to parallel conversion. These functions are performed in the receive T-1 interface 58. The receive T-1 interface 58 is connected to an incoming T-1 line 60 of one of the T-1 carriers. The receive frame alignment function 62 is connected to the T-1 interface 58. Typically, digital crosscon- nect system perform frame alignment only, not superframe alignment. Pseudo-superframe alignment is achieved by reinserting the signalling bits into the data according to the new super frame alignment. The frame alignment function must then provide the following:

1. Elastic buffering to align the receive data with the system frame time, provided by the address counter of the TSI module 10.
2. Extracted signalling bits so that all signalling bits are available when needed for reinsertion into the new super frame alignment.
3. Reinsertion enable/disable control to accommodate those channels which do not use signalling bits. The frame alignment function receives these bits from the master controller interface, provides storage and outputs the appropriate enable bit with each signalling word and PCM byte.
4. Extracted frame bits to support the "connect intact" mode.

The signalling reinsertion function 64 is connected to the receive frame alignment block 62. The signalling reinsertion function multiplexes the appropriate A, B, C, or D signalling bit into bit 8 of the pulse code modulation signal during the appropriate frame as indicated by the address counter and timing generator 68. Only for those channels which are enabled, is this function performed. (Note: The new extended super frame format allows for four signalling bits, A, B, C, and D. The former standard, D4 compatible framing scheme allowed only two signalling bits, A and B. In that case, one can treat C equal to A and D equal to B.)

The address counter and timing generator 68 is connected to both the receive frame alignment 62 and the signalling reinsertion 64. It provides signalling frame information to the signalling reinsertion function and channel/frame timing to the receive frame alignment and trunk conditioning functions. It also provides proper channel and frame alignment to the transmit T-1 interface.

As shown in FIG. 4, the address counter and timing generator 68 is connected to the trunk conditioning function 70 and T-1 outgoing interface 72.

The trunk conditioning function 70 stores the trouble code and alarm signalling states for each of the 24 outgoing channels. Normally, if a particular information bus channel is not in alarm, the trunk conditioning function merely gates the information bus 18 to the transmit T-1 interface 72. However, if the information bus alarm lead is in the alarm state for a particular channel, the trunk conditioning function substitutes the trouble code and alarm signalling bits for that channel. The trouble code is an 8 bit byte which replaces the 8 PCM bits. It can be any 8 bit value, although typically it is the "all ones" quite code for voice frequency channels or a "multiplexer out of synch" code for digital channels. The trunk conditioning function also replaces signalling bits in the signalling frames. It is a two step process, where an initial combination of signalling bits (A, B, C, and D) are transmitted for the first 2.5 seconds of an alarm, followed by a final combination of signalling bits for the remainder of the alarm.

Associated with the trunk conditioning function are individual trunk conditioning and alarm signalling enable bits for each channel so that trouble code insertion or alarm signalling insertion or both may be disabled, depending on the type of channel serviced. For example, digital channels and "connect intact" channels would disable insertion of alarm signalling bits.

Note that the trunk conditioning function must maintain alarm timing for each of the 24 channels. If a channel has been in alarm for more than 2.5 seconds, it begins substituting the final alarm signalling bits. It performs this 2.5 second timing function for each of 24 channels by storing the state of the information bus alarm signal for each channel as a first bit in a per channel 8 bit alarm byte. Every 0.3125 seconds each alarm byte is shifted right. If the alarm signal for a channel is continuously high, after 8 shifts, the alarm byte for that channel contains all 1's, and the final alarm signalling bits can be substituted. Otherwise, if at any time the alarm signal for a channel is zero, the alarm byte is cleared to all zeros.

The transmit T-1 interface 72 performs an 8 bit parallel to serial conversion. Normally, it generates a frame bit structure according to the system superframe alignment. However, in the "connect intact" mode it obtained the frame bits from the information bus. It also performs the unipolar to bipolar conversion, and electrical interface. The transmit T-1 interface 72 connects to the T-1 outgoing line 74.

Signals in the incoming information bus 16 are connected from the signalling reinsertion module 64, from the receive frame alignment module 62, and from the T-1 interface 58. The outgoing information bus 18 is connected to the trunk conditioning function 70. The timing bus 28 is connected to the address counter and timing generator 68.

The master controller interface 76 is connected to the provisioning data link 32, and provides reinsertion enable bits to the receive frame alignment function 62 and trouble codes, initial and final alarm signalling states, trouble code enables, and alarm signalling enables to the trunk conditioning function 70. It provides these for each outgoing channel.

An alarm timing function 78 performs hit integration on received T-1 alarms detected by the receive T-1 interface 58, and outputs an alarm signal to the incoming information bus 16. Hit integration is well known in the prior art as a means for reducing the effects of intermittent alarm conditions.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. In an electric digital crossconnect system for interconnecting a plurality of high frequency T-carrier lines, each having an input line and an output line, comprising:

a plurality of means for interfacing with the input and output lines of the T-carrier lines, each means for interfacing connected to a predetermined one of the T-carrier lines and having an output port and an input port wherein said means for interfacing comprises, receive T-1 interface connected to said incoming T-1 line;

receive frame alignment module connected to said T-1 interface;

signalling reinsertion module connected to said receive frame alignment module;

address counter timing generator module connected to said receive frame alignment module and to said signalling reinsertion module;

trunk conditioning function connected to said address counter generator module and to said outgoing information bus and to said transmit T-1 interface;

master controller interface connected to said trunk conditioning function and to said receive frame alignment module;

transmit T-1 interface connected to said address counter and timing generator and to said trunk conditioning function and connected to the T-1 outgoing line;

wherein said incoming information bus is connected to said signalling reinsertion module said receive frame alignment module and said receive T-1 interface;

means for providing time slot interchanges having at least one input port, at least one output port;

means for providing an incoming information bus connected between each of said output ports of said means for interfacing and said input port of said means for providing time slot interchanges;

means for providing an outgoing information bus connected between each of said input ports of said means for interfacing and said output port of said means for providing time slot interchanges;

means for controlling connected via a provisioning data link to each of said master controller interface and to said means for time slot interchanging;

wherein signals received from the input lines of the T-carrier lines by the means for interfacing are placed in pre-determined time slots on the incoming information bus means and wherein the means for time slot interchanging reorders the signal in time slots on said outgoing information bus means so at the signals can be sent out on predetermined output lines of the T-carrier lines by means for interfacing.

2. The system defined in claim one wherein said means for interfacing are divided into N sets of M means for interfacing and wherein said means for time slot interchanges has N input ports and N output ports and wherein said means for providing an incoming information bus comprises N incoming individual busses and wherein said means for providing an outgoing information bus comprises N outgoing individual buses such that each of said incoming individual busses connects all of said output ports of the respective set of means of interfacing to the corresponding input port of said means for time slot interchanging and such that each of said outoing individual busses connects the corresponding output port of said means for time slot interchanging to all of said input ports of the respective set of means for interfacing.

3. The system defined in claim two wherein each of said means for interfacing has an address counter slaved to an address counter in said means for time slot interchanging.

4. The system defined in claim two wherein each of said means for interfacing has a means for signalling reinsertion such that signalling reinsertion occurs prior to output to the incoming information bus, whereby special leads for signalling bits are eliminated from the incoming information bus.

5. The system defined in claim two wherein said means for providing time slot interchanging comprises:

means for multiplexing, connected to said incoming individual busses and connected to a first high-speed information bus, said means for multiplexing combining said incoming individual busses into said high-speed information bus;

means for providing an information memory having first and second sections and connected to said incoming high speed information bus;

means for providing predetermined addresses connected to said information memory;

means for providing a connection memory connected to said information memory;

means for providing a demultiplexer connected to an outgoing high speed information bus which is connected to said information memory, said means for providing a demultiplexer connected to said outgoing individual busses such that said outgoing high speed information bus is split between said outgoing individual busses.

6. The system defined in claim one wherein said means for interfacing are divided into first and second sets, and wherein said means for time slot interchanges has first and second input ports and first and second output ports, and wherein said means for providing an incoming information bus and said means for providing an outgoing information bus are split such that first incoming and first outgoing information busses are provided between said means for time slot interchanging and said first set of said means for interfacing, and second incoming and second outgoing information busses are provided between said means for time slot interchanging and said second set of means for interfacing.

7. In an electronic digital crossconnect system for interconnecting a plurality of high frequency T-carrier lines, each having an input line and an output line, comprising:

a plurality of means for interfacing with the input and output lines of the T-carrier lines, each means for interfacing connected to a predetermined one of the T-carrier lines and having a plurality of output ports and a plurality of input ports;

a plurality of incoming individual busses connected to said output ports of said means for interfacing;

a plurality of outgoing individual busses connected to said input ports of said means for interfacing;

means for multiplexing, connected to said incoming individual busses and connected to a first high-speed information bus, said means for multiplexing combining said incoming individual busses into said high-speed information bus having a speed greater than said incoming individual busses;

means for providing an information memory having first and second sections and connected to said incoming high speed information bus;

means for providing predetermined addresses connected to said information memory;

means for providing a connection memory connected to said information memory;

means for providing a demultiplexer connected to a second high speed information bus which is connected to said information memory, said means for providing a demultiplexer connected to said outgoing individual busses such that said outgoing high speed information bus is split between said outgoing individual busses having a speed lower than said second high-speed information bus.

* * * * *